UNITED STATES PATENT OFFICE.

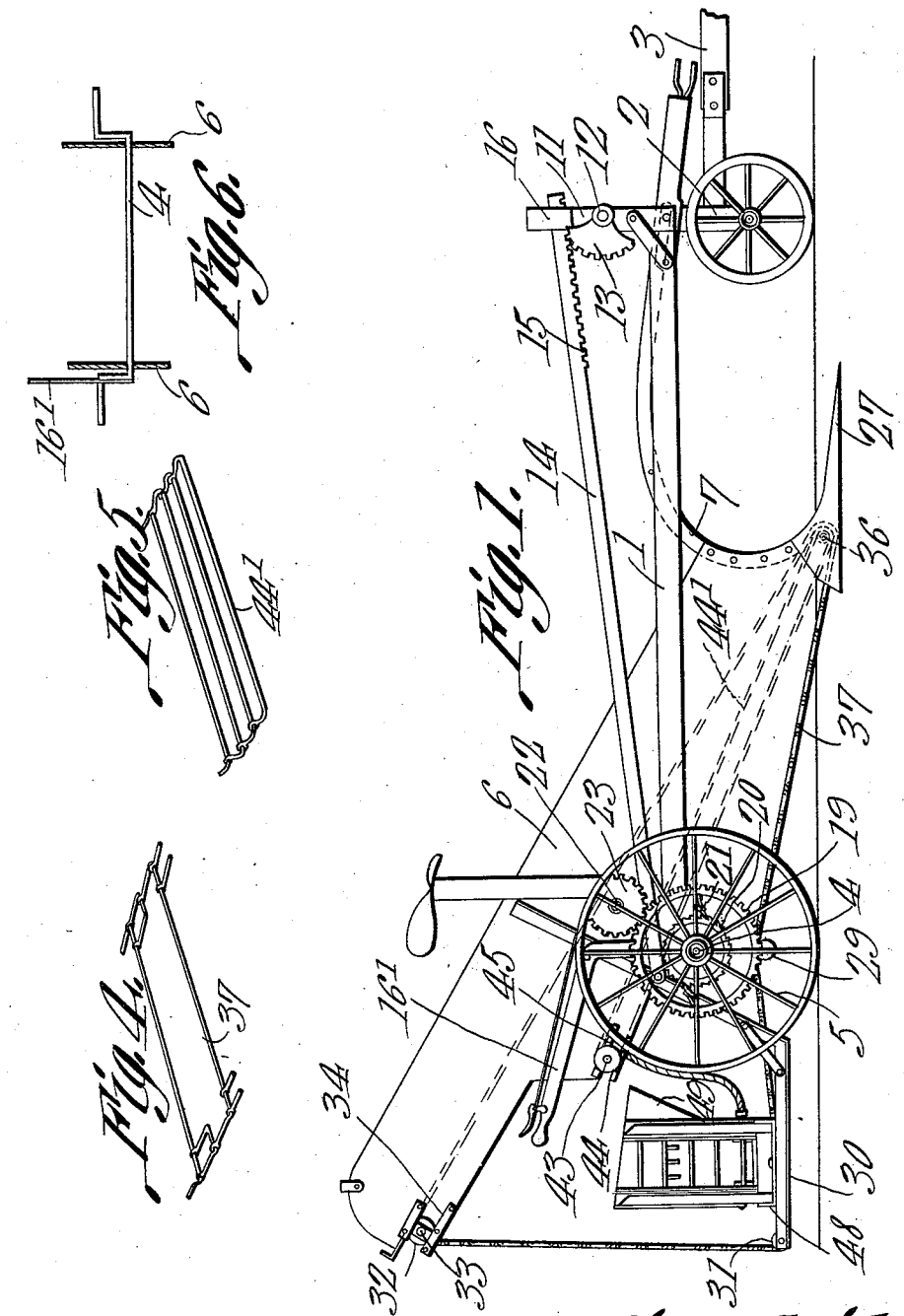

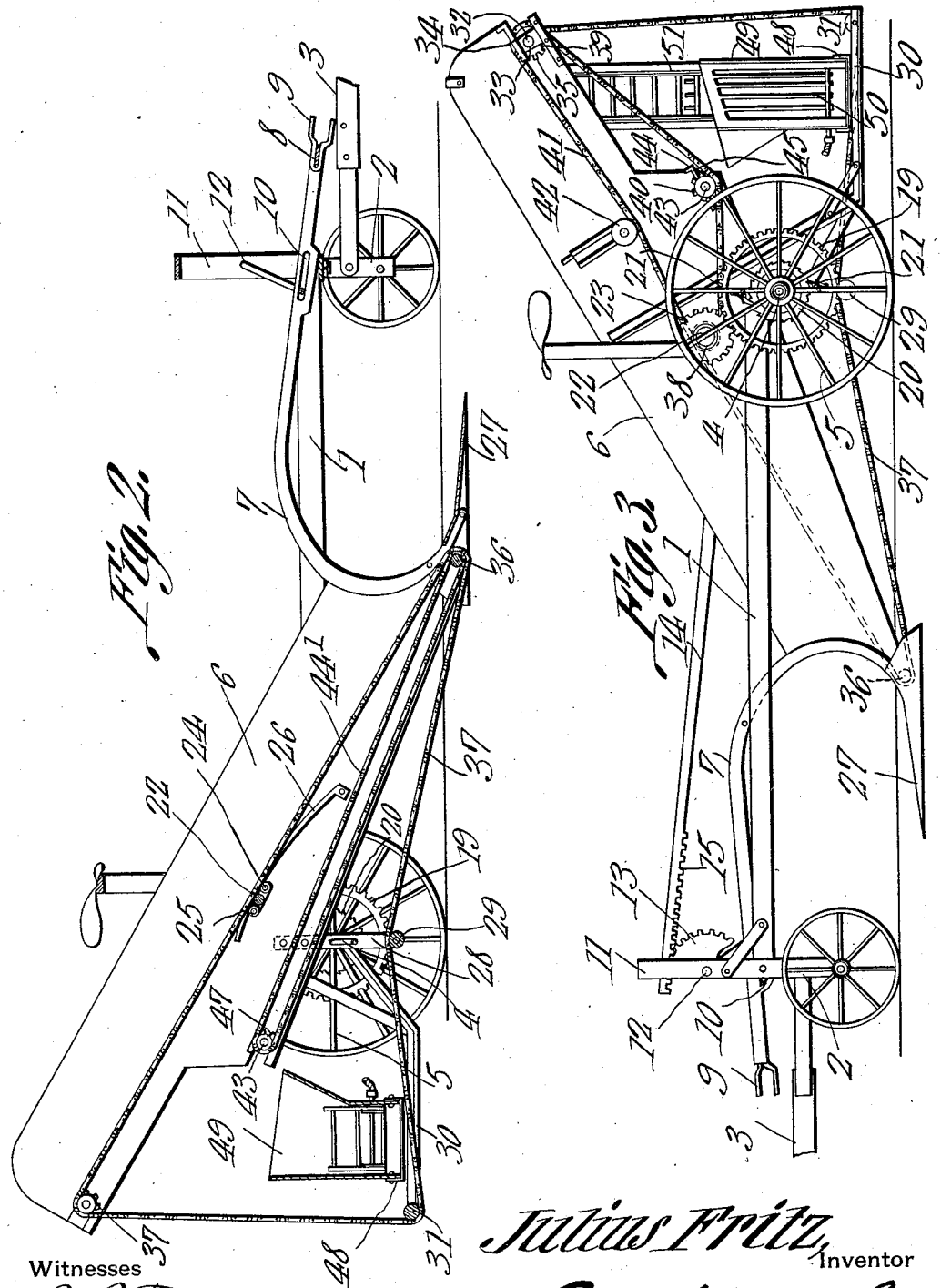

JULIUS FRITZ, OF PETALUMA, CALIFORNIA.

POTATO-DIGGER.

1,008,897.  Specification of Letters Patent.  Patented Nov. 14, 1911.

Original application filed June 3, 1910, Serial No. 564,767. Divided and this application filed December 23, 1910. Serial No. 598,922.

*To all whom it may concern:*

Be it known that I, JULIUS FRITZ, a citizen of the United States, residing at Petaluma, in the county of Sonoma and State of California, have invented a new and useful Potato-Digger, of which the following is a specification.

This invention relates to potato diggers and consists in the novel construction as hereinafter described and claimed.

The subject matter of the present invention is divided from my prior application for patent for potato digger and loader filed in the United States Patent Office, June 3, 1910, Serial No. 564,767.

The object of the invention is to provide a digger of the character indicated with a plurality of endless chain belts adapted to coöperate with each other to clean the potatoes as they are elevated along the machine. These belts are arranged to move in orbit one within the other and the openings provided in the inner belt are smaller than the openings provided in the outer belt therefore the potatoes may pass through the outer belt and lodge upon the inner belt while the dirt and refuse may pass through both belts. From the inner belt the potatoes are delivered into a hopper which is pivotally mounted upon the frame of the digger and the material of large size which is deposited upon the outer belt is carried to the rear end of the machine where it is thrown to the ground.

In the accompanying drawings—Figure 1 is a side elevation of the potato digger. Fig. 2 is a vertical longitudinal sectional view of the same. Fig. 3 is a side elevation of the digger viewing the same from the side opposite to that shown in Fig. 1. Fig. 4 is a perspective view of a section of the outer conveyer belt. Fig. 5 is a perspective view of a section of the inner conveyer belt. Fig. 6 is a detail transverse section showing portions of the walls of the trunk, the U-shaped axle mounted therein and a portion of the attached lever for operating said axle to raise and lower the trunk.

The digger consists of a frame 1 which is pivotally mounted at its forward end upon a wheel supported truck 2. A draft tongue 3 is attached to the truck 2 in the usual manner. The rear portion of the frame 1 is supported upon a U-shaped axle 4 having traction wheels 5 journaled upon its outwardly disposed extremities. A trunk 6 is supported upon the intermediate portion of the axle 4 and when the digger is in operation the said intermediate portion of the said axle is vertically disposed in a downward direction. Beams 7 are attached at their rear end portions to the front ends of the sides of the trunk 6 and the forward ends of said beams 7 are connected together by a cross bar 8. A clevis 9 is located upon the cross bar 8 and is vertically above the rear end portion of the draft tongue 3. The forward end portions of the beams 7 are longitudinally slotted as at 10.

A yoke 11 is mounted upon the forward portion of the frame 1 and serves as a guide for the forward end portion of the beams 7. A crank shaft 12 is journaled at its end portions in the sides of the yoke 11 and the intermediate crank portion of the said shaft passes transversely through the elongated slots 10 provided in the forward end portions of the beams 7. A gear segment 13 is fixed to one end of the crank shaft 12 and a rack bar 14 is provided with a set of gear teeth 15 which mesh with the teeth of the gear segment 13. A guide 16 is mounted upon the yoke 11 and serves to hold the teeth of the rack bar 14 in engagement with the teeth of the segment 13 while the said rack bar 14 moves longitudinally and turns the segment 13 as will be explained hereinafter. A lever 16' is fixed to one of the end portions of the axle 4 and may be used for swinging the same to raise or lower the trunk 6.

Gear wheels 19 are journaled upon the end portions of the axle 4 and ratchet disks 20 are concentrically fixed with relation to the said gear wheels 19. Spring pawls 21 are pivoted upon the spokes of the traction wheels 5 and are resiliently held against the teeth of the disks 20. The said ratchet disks and spring pawls constitute escapement devices commonly used in agricultural machines and serve to turn the gear wheels 19 in unison with the traction wheels 5 when the machine is moving in a forward direction but which permits the said gear wheels 19 to remain at rest when the traction wheels 5 are turning in a rearward direction.

A shaft 22 is journaled for rotation in the end portions in the sides of the trunk 6 and gear wheels 23 are fixed to the ends of the said shaft 22 and lie in the path of movement of the gear wheels 19 when the axle 4 is turned in its bearings upon the trunk 6 as will be explained presently. Arms 24 are fixed to the intermediate portions of the shaft 22 and lie adjacent the inner surfaces of the sides of the trunk 6. Rollers 25 are journaled upon the ends of the arms 24. Guide strips 26 are pivotally connected at their forward ends with the sides of the trunk 6 and are upwardly and rearwardly inclined and extend transversely across the shaft 22 directly above the arms 24 and the rollers 25 carried thereby. The rear portions of the strips 26 are free to swing vertically and are so swung as the shaft 22 rotates and the opposite ends of the arms 24 and the rollers 25 carried thereby alternately come in contact with the under surfaces of the said strips. A digging share 27 is supported at the lower rear ends of the beams 7. Arms 28 depend from the intermediate portions of the trunk 6 and a roller 29 is journaled for rotation between the said arms at a position elevated above the surface of the ground. A platform 30 is supported by the rear end portion of the trunk 6 and is provided at its rear end with a journal roller 31. A roller 32 is journaled in bearings 33 which are adjustably mounted in guides 34 provided upon the sides of the trunk 6. The roller 32 is provided with two sets of gear teeth 35. A roller 36 is journaled to the share 27 below the rear edge thereof and is spaced a short distance above the same. An endless conveyer 37 is arranged to move about the rollers 31, 32, 36 and over the roller 29 supported by the arms 28. The upper run of the said conveyer passes over the guide strips 26 and is in contact with the same. The endless conveyer 37 is made up of a series of rods linked together at their ends and having their intermediate portions spaced from each other, the space between the intermediate portions of the said rods being sufficient to permit potatoes and soil to pass through but the said intermediate portions of the rods are in such close relation as to prevent the foliage of the plants from passing down between the same. A sprocket wheel 38 is fixed to one of the end portions of the shaft 22. A sprocket wheel 39 is fixed to the shaft of the roller 32 and an idle sprocket wheel 40 is journaled upon one of the sides of the trunk 6. A sprocket chain 41 passes around the sprocket wheels 38, 39 and 40 and is adapted to transmit rotary movement from the shaft 22 to the roller 32 and the said roller in turn will actuate the endless conveyer 37. During the time that the upper run of the conveyer 37 is moving over the guide strips 26 the roller 25 at the opposite ends of the arms 24 alternately come in contact with the said guide strips 26 vertically and the said guide strips in turn agitate the upper run of the conveyer 37 to facilitate separation of the potatoes from vines or plants. A slack absorber 42 is located upon one of the sides of the trunk 6 and bears upon the upper run of the sprocket chain 41 and serves to keep the said sprocket chain taut.

The sprocket wheel 40 is fixed to a shaft 43 which in turn is journaled in the bearings 44 adjustably mounted in guides 45 located at the sides of the trunk 6. Sprocket wheels 47 are mounted upon the intermediate portion of the shaft 43. A conveyer 44' is located within the conveyer 37 and passes around the sprocket wheels 47 and shaft 43 and the roller 36 journaled at the rear portion of the share 27. The conveyer 44' is similar in structure to the conveyer 37 with the exception that the intermediate portions of its bars are closer together and there is not sufficient space between the said portions of the said bars to permit potatoes to fall through.

A yoke 48 is pivoted upon the platform 30 for horizontal swinging movement and a hopper 49 is pivoted between the ends of the yoke 48 for vertical swinging movement. The hopper 49 is provided with an inclined slatted bottom section 50 and the lower end of a conveyer trunk 51 is fixed to the hopper 49 and is in synclinal relation to the bottom section 50 thereof.

As the digger is drawn in a forward direction the share 27 will pass under the tubers and lift the same together with top soil and the vines upon the upper run of the conveyer 37. The potatoes and soil will fall through the links of the said conveyer while the vines will rest upon the upper run and will be carried up and pass over beyond the end of the trunk 6. The tubers will drop down between the links of the conveyer 37 upon the links of the conveyer 44' and the soil will pass through the spaces between the links of the conveyer 44' and deposit upon the ground. The potatoes are carried up by the upper run of the conveyer 44' and are deposited in the hopper 49, the potatoes are then engaged by the conveyer mounted in the trunk 51 and carried to one side of the digger. At the time the vines are passing along the upper run of the conveyer 37, the conveyer is agitated by the arms 24 carried by the shaft 22 and thus separation of the tubers from the vines is facilitated.

When it is desired to pass the digger over the surface of the ground with the share 27 elevated above the soil and the conveyers 37 and 44' at a state of rest the lever 16' is swung in a forward direction which will turn the axle 4 in its bearings in the trunk 6 so that the crank extremities of the said axle will be swung in a downward direction. This movement on the part of the axle 4 will carry the traction wheels 5 down and the rear portion of the trunk 6 is elevated. At the same time the bar 14 is moved in a forward direction and the teeth 15 engaging the segment 13 will partially rotate the shaft 12 and the intermediate crank portion of the said shaft is moved in an upward direction and thus the forward ends of the beams 7 are lifted. This movement on the part of the trunk 6 and beams 7 will lift the share 27 above the surface of the ground.

Having described the invention, what I claim as new and desire to secure by Letters Patent is:

1. A digger comprising a wheel-mounted frame, an inclined trunk supported upon the frame, a digging share located at the lower end of the trunk, a rotatable member located at the lower end of the trunk below the rear edge of the share, inner and outer conveyers mounted for movement along the trunk and trained around said rotatable member, means for operating the conveyers from the supporting wheels, the outer conveyer having rods spaced at greater distance apart than the rods of the inner conveyer.

2. A digger comprising a wheel-mounted frame, an inclined trunk supported upon the frame, a digging share located at the lower end of the trunk, a rotatable member located at the lower end of the trunk below the rear edge of the share, inner and outer conveyers mounted for movement along the trunk and both trained around said rotatable member, means for operating the conveyer from the supporting wheels, the outer conveyer having rods spaced at greater distance apart than the rods of the inner conveyer, and a hopper pivotally mounted upon the frame and located within the outer conveyer, said hopper having its receiving end located below the delivery end of the inner conveyer.

In testimony that I claim the foregoing as my own, I have hereto affixed my signature in the presence of two witnesses.

JULIUS FRITZ.

Witnesses:
 JACOB E. JACOBSEN,
 J. H. GWINN.

Copies of this patent may be obtained for five cents each, by addressing the "Commissioner of Patents, Washington, D. C."